(12) United States Patent
Van Der Stockt et al.

(10) Patent No.: US 11,200,452 B2
(45) Date of Patent: Dec. 14, 2021

(54) AUTOMATICALLY CURATING GROUND TRUTH DATA WHILE AVOIDING DUPLICATION AND CONTRADICTION

(71) Applicant: International Business Machines Corporation, Armonk, NY (US)

(72) Inventors: Stefan Van Der Stockt, Johannesburg (ZA); Sihang B. Fang, Glendale, CA (US); Manali Jairam Chanchlani, Jersey City, NJ (US); Rahul P. Akolkar, Austin, TX (US); Sarah Lynch, Austin, TX (US); Kristi Farinelli, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 15/884,204

(22) Filed: Jan. 30, 2018

(65) Prior Publication Data
US 2019/0236409 A1    Aug. 1, 2019

(51) Int. Cl.
*G06K 9/62*    (2006.01)
*G06N 20/00*    (2019.01)

(52) U.S. Cl.
CPC ........... *G06K 9/6256* (2013.01); *G06K 9/627* (2013.01); *G06N 20/00* (2019.01)

(58) Field of Classification Search
CPC ...... G06K 9/6256; G06K 9/627; G06N 20/00; G06F 40/20
See application file for complete search history.

(56) References Cited

U.S. PATENT DOCUMENTS

| | | | | |
|---|---|---|---|---|
| 5,835,901 | A | * | 11/1998 | Duvoisin, III ......... G06K 9/627 706/19 |
| 7,287,019 | B2 | | 10/2007 | Kapoor et al. |
| 8,645,290 | B2 | * | 2/2014 | Tyson .................... G06N 20/00 706/12 |
| 9,344,112 | B2 | | 5/2016 | Zheng et al. |
| 9,460,386 | B2 | | 10/2016 | Fan et al. |
| 9,589,049 | B1 | | 3/2017 | Carrier et al. |
| 9,613,317 | B2 | | 4/2017 | Beamon et al. |
| 9,720,981 | B1 | | 8/2017 | Boguraev et al. |
| 10,282,678 | B2 | * | 5/2019 | Block ...................... G06N 5/02 |

(Continued)

FOREIGN PATENT DOCUMENTS

WO    2015181511 A1    12/2015

OTHER PUBLICATIONS

Chen, Yihua, et al. "Similarity-based classification: Concepts and algorithms." Journal of Machine Learning Research 10.3 (2009).*

(Continued)

*Primary Examiner* — Paulinho E Smith
(74) *Attorney, Agent, or Firm* — Zilka-Kotab, P.C.

(57) ABSTRACT

A computer-implemented method according to one embodiment includes identifying a first classifier training data element and a second classifier training data element, calculating a similarity metric between the first classifier training data element and the second classifier training data element, and determining a classification for the first classifier training data element and the second classifier training data element, utilizing the similarity metric between the first classifier training data element and the second classifier training data element.

18 Claims, 5 Drawing Sheets

(56) References Cited

U.S. PATENT DOCUMENTS

| | | | |
|---|---|---|---|
| 2002/0147694 A1* | 10/2002 | Dempsey | G06K 9/6256 706/12 |
| 2002/0147754 A1* | 10/2002 | Dempsey | G06K 9/6215 708/671 |
| 2007/0255555 A1 | 11/2007 | Crouch et al. | |
| 2009/0157572 A1* | 6/2009 | Chidlovskii | G06N 20/00 706/12 |
| 2010/0082639 A1 | 4/2010 | Li et al. | |
| 2012/0221508 A1* | 8/2012 | Chaturvedi | G06F 16/00 707/602 |
| 2015/0278241 A1* | 10/2015 | Bates-Haus | G06F 16/215 707/692 |
| 2016/0070986 A1* | 3/2016 | Chidlovskii | G06K 9/6267 382/104 |
| 2017/0046624 A1 | 2/2017 | Murdock, IV et al. | |
| 2017/0132512 A1* | 5/2017 | Ioffe | G06N 3/08 |
| 2017/0140290 A1 | 5/2017 | Block et al. | |
| 2017/0154015 A1 | 6/2017 | O'Keeffe et al. | |
| 2017/0169354 A1 | 6/2017 | Diamanti et al. | |
| 2017/0169355 A1 | 6/2017 | Boyer et al. | |
| 2017/0192976 A1 | 7/2017 | Bhatia et al. | |
| 2019/0005408 A1* | 1/2019 | Pin | G06Q 30/06 |
| 2019/0034801 A1* | 1/2019 | Sodhani | G06N 3/088 |

OTHER PUBLICATIONS

Gao, Bin-Bin, et al. "Deep label distribution learning with label ambiguity." IEEE Transactions on Image Processing 26.6 (2017): 2825-2838.*

Carbonera, "an efficient approach for instance selection," int'l conf. big data analytics and knowledge discovery 228-43 (2017).*

Bakis, Raimo, et al. "Performance of natural language classifiers in a question-answering system." IBM Journal of Research and Development 61.4/5 (2017): 14-1.*

Dragos, V., "Detection of contradictions by relation matching and uncertainty assessment," Science Direct, Procedia Computer Science, vol. 112, 2017, pp. 71-80.

Zhu et al., "Visual7W: Grounded Question Answering in Images," IEEE Conference on Computer, Jun. 2016, pp. 4995-5004.

Wan et al., "Modeling Ambiguity, Subjectivity, and Diverging Viewpoints in Opinion Question Answering Systems," IEEE 16th International Conference on Data Mining, Dec. 2016, 10 pages.

Timmermans et al., "Crowdsourcing ground truth for Question Answering using CrowdTruth," WebSci '15, ACM, Jun. 28-Jul. 1, 2015, pp. 1-2.

NIST Cloud Computing Program, Dec. 9, 2013, pp. 1-2, Retrieved From http://www.nist.gov/itl/cloud/.

Mell et al., "Definition of Cloud Computing," National Institute of Standards and Technology, Information Technology Laboratory, Version 15, 2009, pp. 1-2.

Mell et al., "Definition of Cloud Computing," NIST Special Publication 800-145, 2001, pp. 1-7.

Ahmed et al., "A Generic Method for Automatic Ground Truth Generation of Camera-captured Documents," Cornell University Library, May 2016, pp. 1-15.

Rahm et al., "Data Cleaning: Problems and Current Approaches,"IEEE Data Engineering Bulletin, 2000, pp. 1-11, retrieved from http://betterevaluation.org/sites/default/files/data_cleaning.pdf.

Geng, X., "Label Distribution Learning," arXiv, 2016, 14 pages, retrieved from https://arxiv.org/abs/1408.6027v2.

* cited by examiner

AUTOMATICALLY CURATING GROUND TRUTH DATA WHILE AVOIDING DUPLICATION AND CONTRADICTION

BACKGROUND

The present invention relates to data classification and training, and more specifically, this invention relates to optimizing ground truth data used to train a data classifier.

Classifier training (e.g., using ground truth data) is an important operation that helps the classifier perform accurate classification operations. However, the quality of the ground truth data has a large impact on the accuracy and efficiency of the classifier. For example, ground truth data sets may often contain records that do not add information and waste limited available record slots for training the classifier. These data sets may also include conflicting records that may make the classifier less accurate. As a result, training a classifier with a raw ground truth data set may result in classifier inefficiencies.

SUMMARY

A computer-implemented method according to one embodiment includes identifying a first classifier training data element and a second classifier training data element, calculating a similarity metric between the first classifier training data element and the second classifier training data element, and determining a classification for the first classifier training data element and the second classifier training data element, utilizing the similarity metric between the first classifier training data element and the second classifier training data element.

According to another embodiment, a computer program product for automatically curating ground truth data while avoiding duplication and contradiction comprises a computer readable storage medium having program instructions embodied therewith, where the computer readable storage medium is not a transitory signal per se, and where the program instructions are executable by a processor to cause the processor to perform a method comprising identifying a first classifier training data element and a second classifier training data element, utilizing the processor, calculating a similarity metric between the first classifier training data element and the second classifier training data element, utilizing the processor, and determining, utilizing the processor, a classification for the first classifier training data element and the second classifier training data element, utilizing the similarity metric between the first classifier training data element and the second classifier training data element.

A system according to another embodiment includes a processor, and logic integrated with the processor, executable by the processor, or integrated with and executable by the processor, where the logic is configured to identify a first classifier training data element and a second classifier training data element, calculate a similarity metric between the first classifier training data element and the second classifier training data element, and determine a classification for the first classifier training data element and the second classifier training data element, utilizing the similarity metric between the first classifier training data element and the second classifier training data element.

Other aspects and embodiments of the present invention will become apparent from the following detailed description, which, when taken in conjunction with the drawings, illustrate by way of example the principles of the invention.

DETAILED DESCRIPTION

Figure 1:
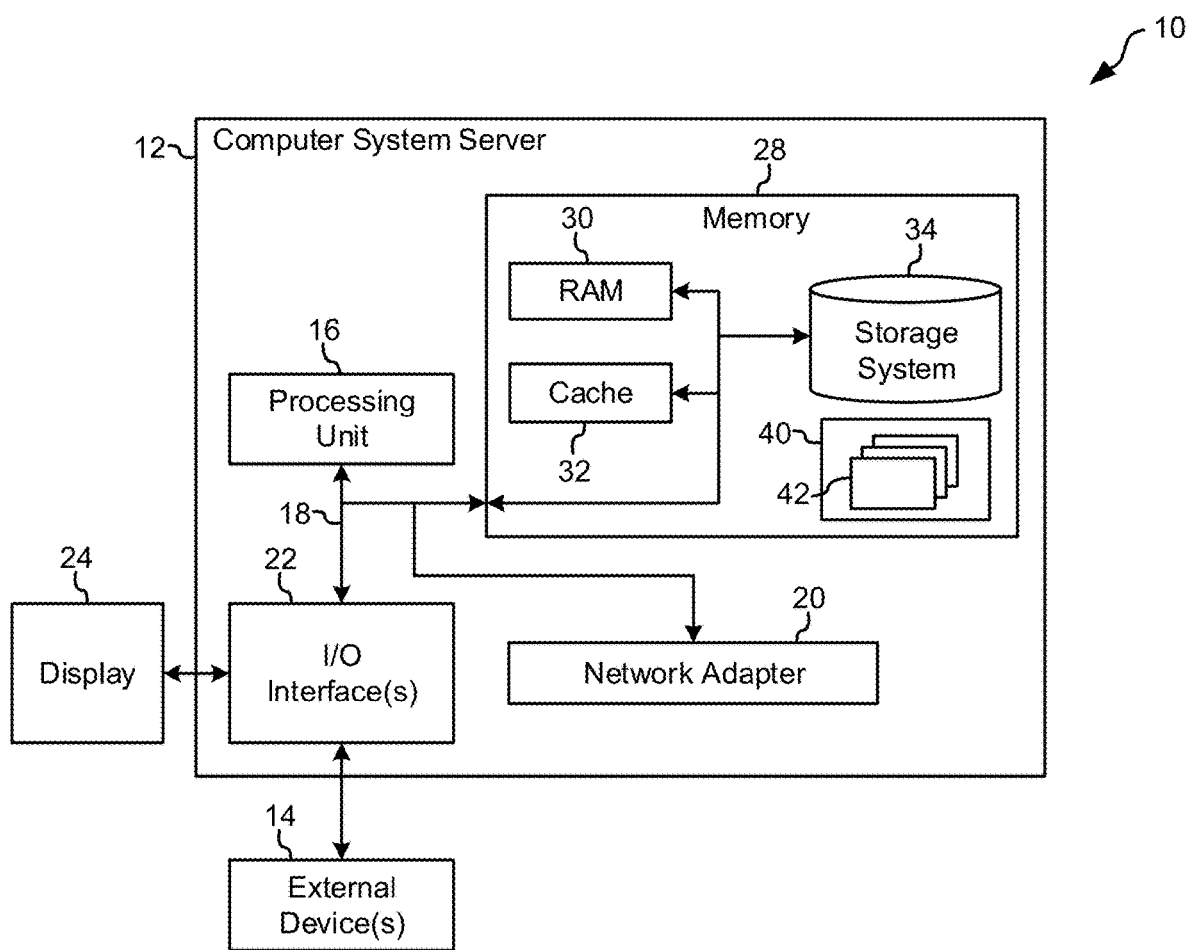
FIG. 1 depicts a cloud computing node according to an embodiment of the present invention.

The following description discloses several preferred embodiments of systems, methods and computer program products for automatically curating ground truth data while avoiding duplication and contradiction. Various embodiments provide a method to determine classifications for training data elements, utilizing similarity metrics determined for those training data elements.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for automatically curating ground truth data while avoiding duplication and contradiction.

In one general embodiment, a computer-implemented method includes identifying a first classifier training data element and a second classifier training data element, calculating a similarity metric between the first classifier training data element and the second classifier training data element, and determining a classification for the first classifier training data element and the second classifier training data element, utilizing the similarity metric between the first classifier training data element and the second classifier training data element.

In another general embodiment, a computer program product for automatically curating ground truth data while avoiding duplication and contradiction comprises a computer readable storage medium having program instructions embodied therewith, where the computer readable storage medium is not a transitory signal per se, and where the program instructions are executable by a processor to cause the processor to perform a method comprising identifying a first classifier training data element and a second classifier training data element, utilizing the processor, calculating a similarity metric between the first classifier training data element and the second classifier training data element, utilizing the processor, and determining, utilizing the processor, a classification for the first classifier training data element and the second classifier training data element, utilizing the similarity metric between the first classifier training data element and the second classifier training data element.

In another general embodiment, a system includes a processor, and logic integrated with the processor, executable by the processor, or integrated with and executable by the processor, where the logic is configured to identify a first classifier training data element and a second classifier training data element, calculate a similarity metric between the first classifier training data element and the second classifier training data element, and determine a classification for the first classifier training data element and the second classifier training data element, utilizing the similarity metric between the first classifier training data element and the second classifier training data element.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
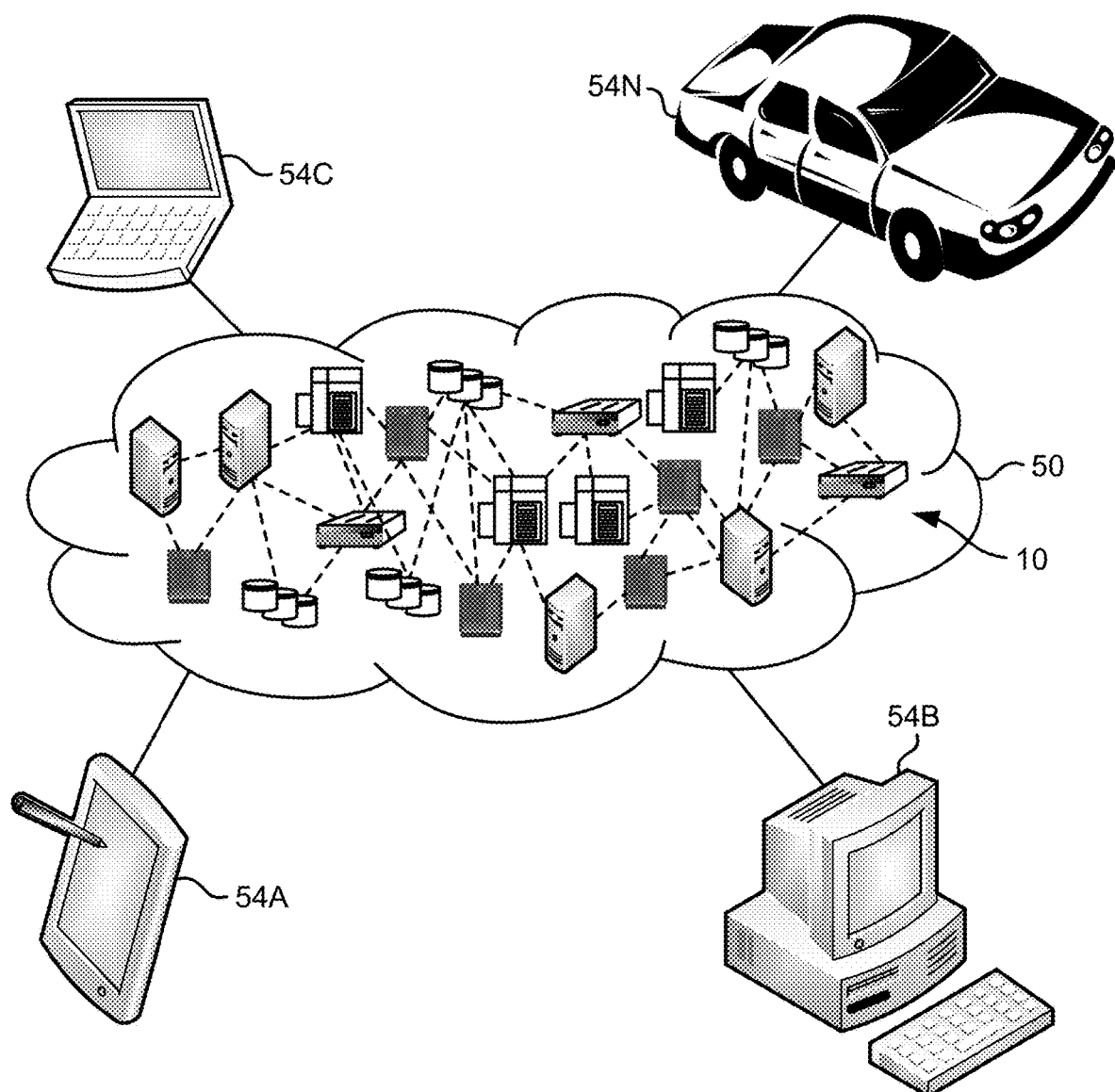
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
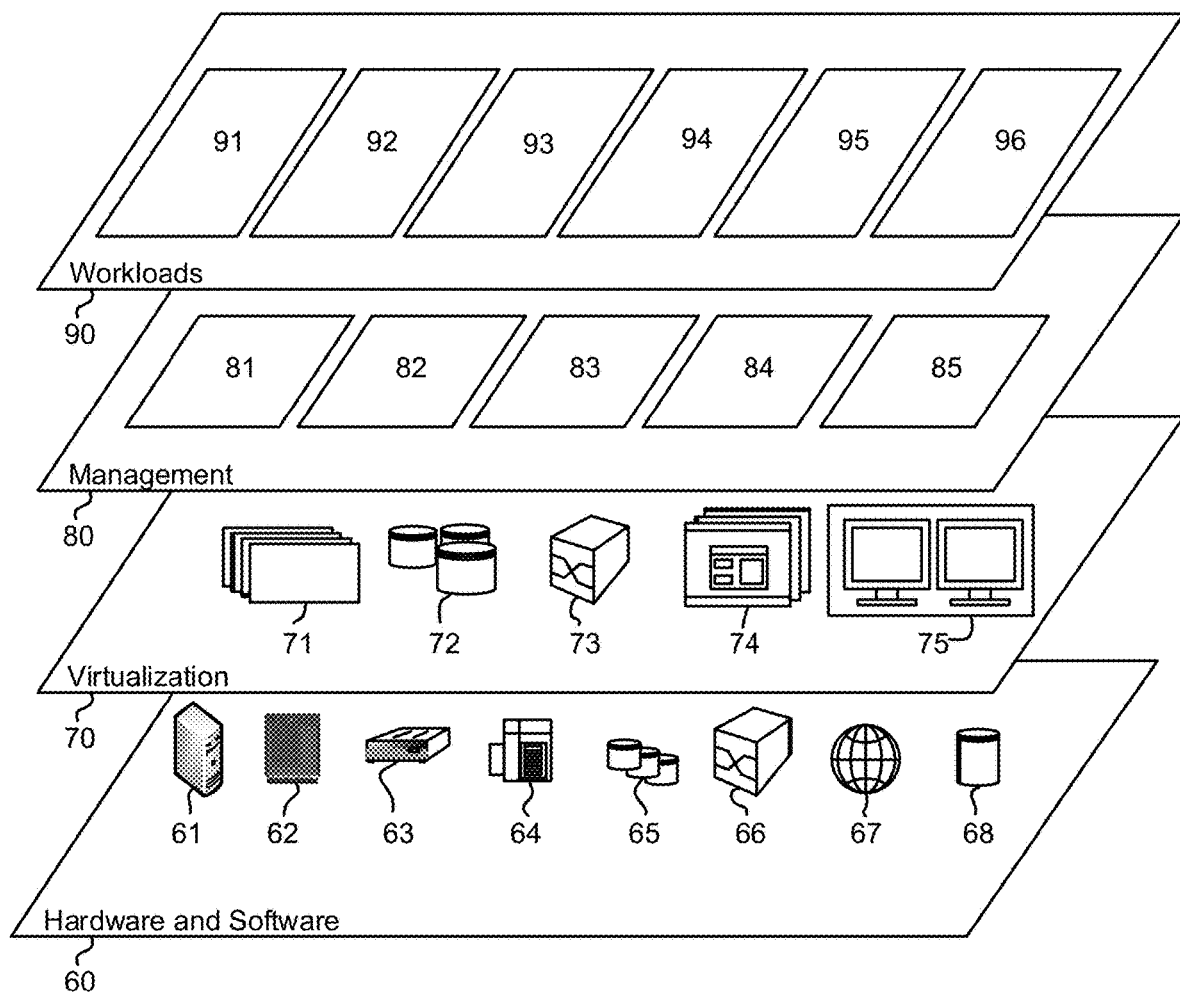
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and card stunt as a service (CaaS) 96.

Figure 4:
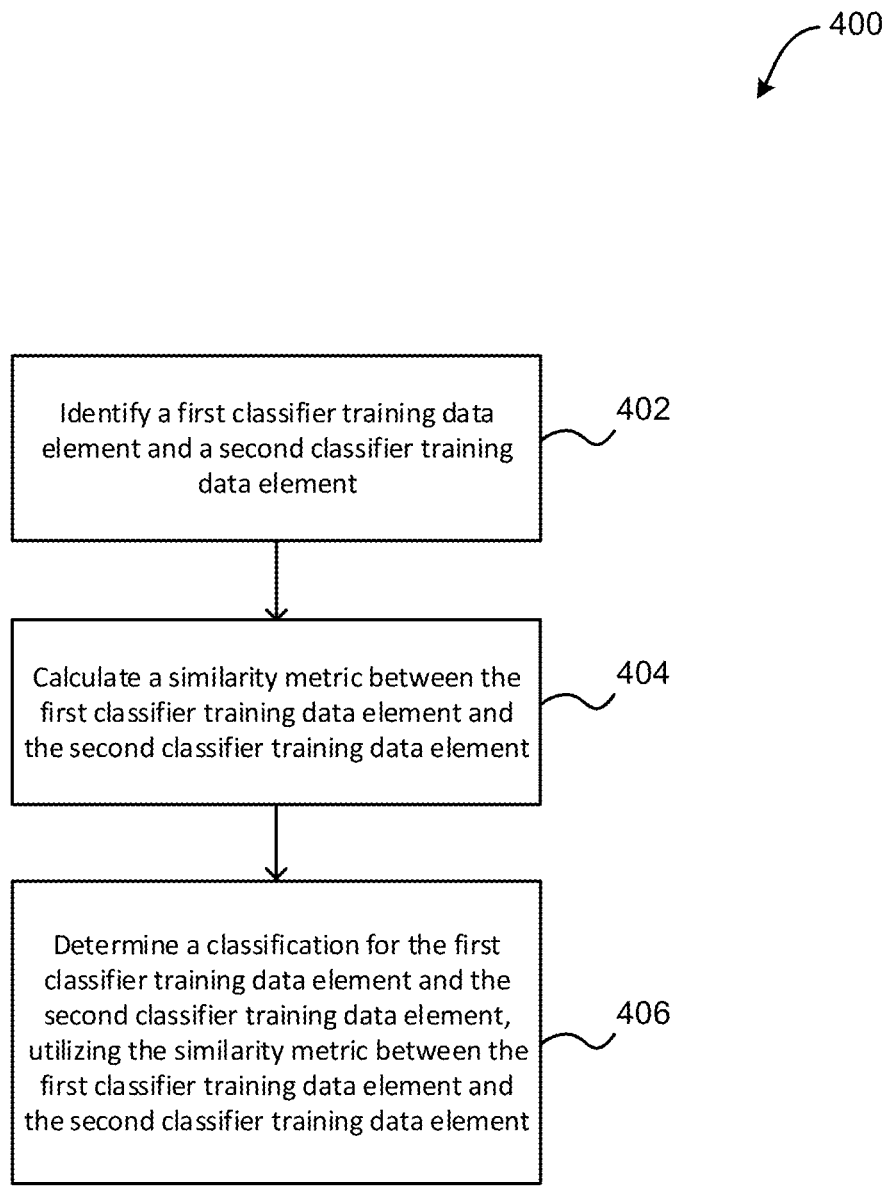
FIG. 4 illustrates a method for automatically curating ground truth data while avoiding duplication and contradiction, in accordance with one embodiment.

Now referring to FIG. 4, a flowchart of a method 400 for filling in an entity within an image is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a first classifier training data element and a second classifier training data element are identified. In one embodiment, the first classifier training data element and the second classifier training data element may be included within a plurality of classifier training data elements used to train a classifier. For example, a plurality of classifier training data elements may be included within a raw ground truth data set.

Additionally, in one embodiment, each classifier training data element may include textual data and a label. For example, the textual data may include an alphanumeric textual string. In another example, the textual data may be representative of a natural language statement. In yet another example, the label may include a class associated with/assigned to the textual data.

Further, in one embodiment, the classifier may include a natural language classifier. For example, the classifier may include one or more of a neural network, a support vector machine (SVM), a regression classifier, etc. In another embodiment, the classifier may classify textual data in English or any other language. In yet another embodiment, the first classifier training data element and the second classifier training data element may be received at an automatic ground truth generator. In still another embodiment, the classifier may be trained in a cloud computing environment.

Further still, as shown in FIG. 4, method 400 may proceed with operation 404, where a similarity metric is calculated between the first classifier training data element and the second classifier training data element. In one embodiment, the similarity metric may be determined between the textual data of the first classifier training data element and the textual data of the second classifier training data element. In another embodiment, the similarity metric may be determined within the automatic ground truth generator (e.g., utilizing a similarity measure module within the automatic ground truth generator). In yet another embodiment, the similarity metric may be determined outside of the automatic ground truth generator (e.g., utilizing a similarity measure module external to the automatic ground truth generator).

Also, in one embodiment, the similarity metric may be calculated utilizing one or more similarity measures. For example, the similarity measures may determine a numerical value indicative of a similarity between textual input data. In another example, the similarity metric may be calculated by computing the Levenshtein ratio between the textual data of the first classifier training data element and the textual data of the second classifier training data element, where the Levenshtein ratio is a ratio based on a string metric (Levenshtein distance) between the textual data of the first classifier training data element and the textual data of the second classifier training data element.

In addition, in one embodiment, the similarity metric may be calculated utilizing a character gram (e.g., chargram(n), etc.) that determines a value indicating a similarity between characters and/or phrases within the textual data of the first classifier training data element and the textual data of the second classifier training data element. In another embodiment, the similarity metric may be calculated utilizing a harmonic mean between the similarity metric determined utilizing the Levenshtein ratio and the similarity metric determined utilizing a character gram.

Furthermore, as shown in FIG. 4, method 400 may proceed with operation 406, where a classification for the first classifier training data element and the second classifier training data element is determined, utilizing the similarity metric between the first classifier training data element and the second classifier training data element. In one embodiment, the classification may be determined utilizing the label of the first classifier training data element and the label of the second classifier training data element.

Further still, in one embodiment, determining the classification may include analyzing the similarity metric in view of the label of the first classifier training data element and the label of the second classifier training data element. In another embodiment, the classification may be determined to be one of three types. For example, the classification may include an indication that the first classifier training data element is similar to the second classifier training data element (e.g., when the similarity metric indicates that the text of the elements is similar, and the labels of the elements are determined to be similar).

Also, in one example, the classification may include an indication that the first classifier training data element is dissimilar from the second classifier training data element (e.g., when the similarity metric indicates that the text of the elements is different, and the labels of the elements are determined to be different). In another example, the classification may include an indication that the first classifier training data element and the second classifier training data element are conflicting (e.g., when the similarity metric indicates that the text of the elements is similar, but the labels of the elements are determined to be different).

Additionally, in one embodiment, the classification may be added as metadata to the first classifier training data element and the second classifier training data element. In another embodiment, metadata identifying the first classifier training data element may be added to the second classifier training data element in association with the classification. In yet another embodiment, metadata identifying the second classifier training data element may be added to the first classifier training data element in association with the classification. In still another embodiment, the classification may be performed in a cloud computing environment.

Further, in one embodiment, the first classifier training data element and the second classifier training data element may be conditionally used to train the classifier, based on the classification. For example, the first classifier training data element and the second classifier training data element may be included as new ground truth data and may be used to train the classifier in response to determining that the classification includes an indication that the first classifier training data element is dissimilar from the second classifier training data element. In another example, the first classifier training data element and the second classifier training data element may be included as new ground truth data and may be used to train the classifier in response to determining that the classification includes an indication that the first classifier training data element is similar to the second classifier training data element. For instance, the elements may be included in the new ground truth data when they are determined to be similar, but they may be assigned a lower priority than other elements that are determined to be dissimilar.

Further still, in one embodiment, a predetermined distribution of labels for classifier training data elements may be identified. For example, the predetermined distribution may include an original distribution of labels found in the raw ground truth data set. In another example, the first classifier training data element and the second classifier training data element may be included as new ground truth data and may be used to train the classifier in response to determining that the inclusion of such elements maintains the predetermined distribution of labels found in the raw ground truth data set. In another embodiment, the first classifier training data element and the second classifier training data element may be discarded and not used to train the classifier in response to determining that the classification includes an indication that the first classifier training data element and the second classifier training data element are conflicting.

In this way, relevant and effective ground truth data may be obtained from a raw ground truth data set, which may result in more efficient and effective training. Additionally, the classification of training data may be automated (instead of being manually performed). Further, a performance of the classifier may be enhanced, as more effective and valuable classifier training data elements may be used to train the classifier.

Figure 5:
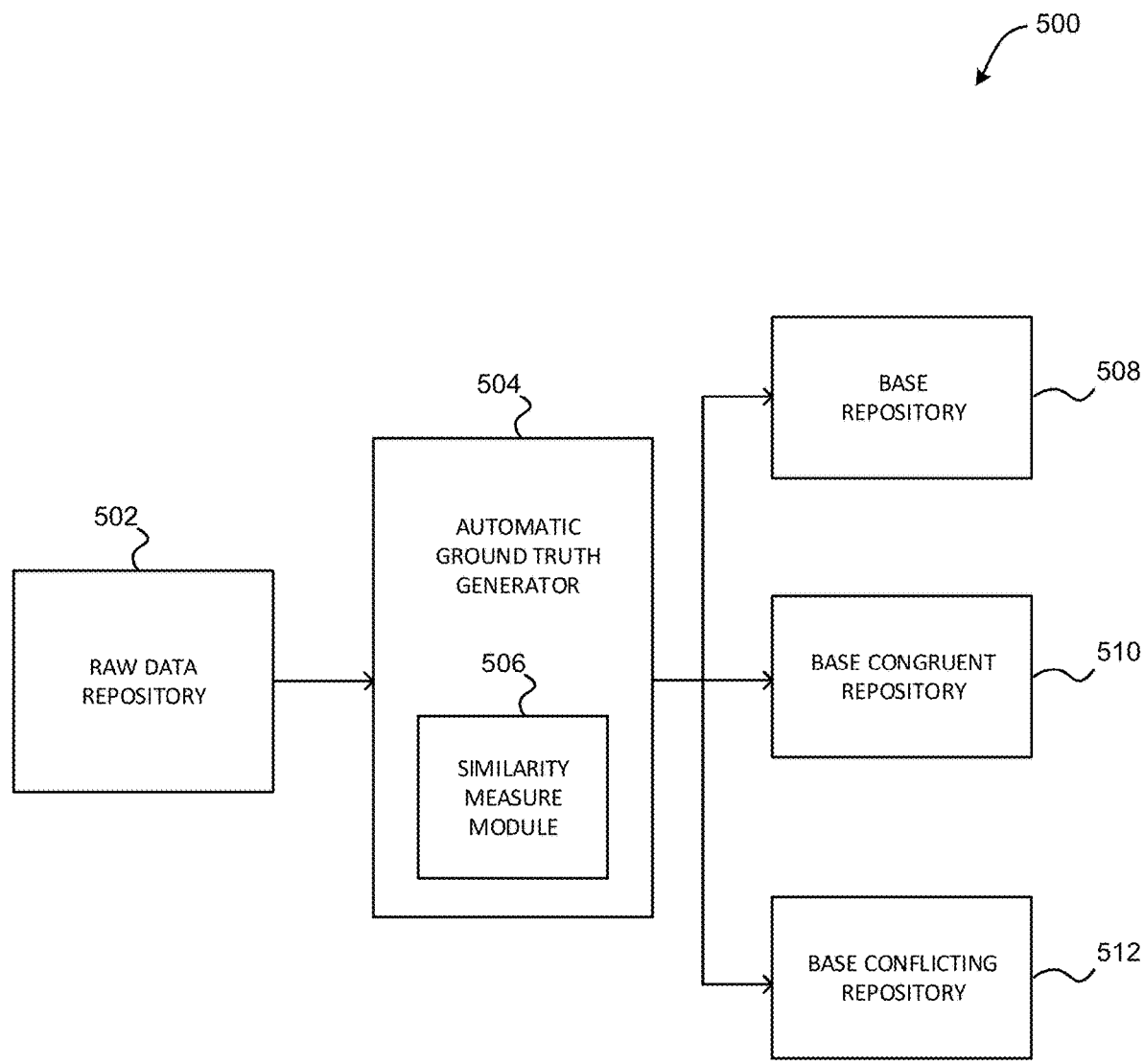
FIG. 5 illustrates an exemplary ground truth curation environment, in accordance with one embodiment.

FIG. 5 illustrates an exemplary ground truth curation environment 500, according to one exemplary embodiment. As shown, a raw data repository 502 is in communication with an automatic ground truth generator 504. Additionally, the automatic ground truth generator 504 includes a similarity measure module 506. Although the similarity measure module 506 is shown as being included within the automatic ground truth generator 504, in another embodiment, the similarity measure module 506 may be independent from the automatic ground truth generator 504.

Further, in one embodiment, the automatic ground truth generator 504 may receive a plurality of raw training data elements from the raw data repository 502. In another embodiment, the plurality of raw training data elements may include a group of training data elements meant to train a classifier (e.g., a natural language classifier, etc.). In yet another embodiment, each of the plurality of raw training data elements may include both textual data and a label.

Further still, in one embodiment, in response to receiving the plurality of raw training data elements from the raw data repository 502, the automatic ground truth generator 504 may utilize the similarity measure module 506 to determine a similarity metric between pairs of elements within the plurality of raw training data elements. For example, the automatic ground truth generator 504 may send the textual data from a pair of elements to the similarity measure module 506, and the similarity measure module 506 may return a similarity metric based on a comparison of the textual data.

Also, in one embodiment, the automatic ground truth generator 504 may utilize the determined similarity metrics between pairs of elements within the plurality of raw training data elements, as well as the labels of elements within the plurality of raw training data elements, in order to determine, for each of the plurality of raw training data elements, whether the element belongs in a base repository 508, a base congruent repository 510, or a base conflicting repository 512. In one embodiment, elements stored within the base repository 508 may include dissimilar elements, elements stored within the base congruent repository 510 may include similar elements, and elements stored within the base conflicting repository 512 may include conflicting elements.

In addition, in one embodiment, elements stored within the base repository 508 may be used as ground truth training data elements for a classifier. For example, the classifier may be trained utilizing the elements within the base repository 508. In another embodiment, one or more of the elements stored within the base congruent repository 510 may also be used as ground truth training data elements for a classifier.

For example, labels may be identified for each of the plurality of raw training data elements from the raw data repository 502, and a raw label distribution may be determined, utilizing the identified labels. Furthermore, labels may be identified for each of the elements within the base repository 508, and a ground truth label distribution may be determined, utilizing the labels for the elements within the base repository 508. The raw label distribution may be compared to the ground truth label distribution, and based on the comparison, it may be determined that a predetermined number of elements with predetermined labels need to be added to the elements within the base repository 508 in order for the ground truth label distribution to match the raw label distribution.

The predetermined number of elements with predetermined labels may then be retrieved from the base congruent repository 510, and may be used to train the classifier along with the elements within the base repository 508. The predetermined number of elements with predetermined labels may also be moved from the base congruent repository 510 to the base repository 508. In this way, the label distribution for the elements used to train the classifier may match the label distribution for the plurality of raw training data elements received from the raw data repository 502.

In this way, the automatic ground truth generator 504 may automatically detect similar, dissimilar, and contradictory items in the raw training data elements using the similarity measure module 506. This may reduce manual editing of elements, reduce data errors, enhance classifier accuracy, and minimize an amount of data needed to train a classifier.

Table 1 includes examples of similar, dissimilar, and conflicting records, in accordance with one embodiment. Of course, it should be noted that the examples shown in Table 1 are set forth for illustrative purposes only, and thus should not be construed as limiting in any manner.

TABLE 1

Similar records don't add any new information and waste record slots:
I.e. "What is the shortest route to the restaurant?: Dining" vs.
"What is the shortest route to a restaurant?: Dining"
Dissimilar records add new information, and make the classifier more informed:
I.e. "What is the shortest route to the restaurant?: Dining" vs.
"How do I get to the restaurant fast?: Dining"
Conflicting records confuse the model, and may make the classifier less accurate:
"What is the shortest route to the restaurant?: Dining" vs.
"What is the shortest route to a restaurant?: Directions"

Table 2 includes exemplary pseudocode for classifying training data elements, in accordance with one embodiment. Of course, it should be noted that the pseudocode shown in Table 2 is set forth for illustrative purposes only, and thus should not be construed as limiting in any manner.

TABLE 2

Read in raw data as input dataframe, calculate label distributions in raw
Initialize base and sim_candidate dataframes
// Step 1: find all dissimilar items in the raw dataset.
for each row r_i in input:
    detect similarity between r_i and base using similarity suite
    if r_i is similar to any item in base:
        add to sim_candidates dataframe
    else:
        add to base dataframe
// Step 2: find all similar items in the final base dataframe
for each row s in sim_candidates:
    find all similar items in the final base set using similarity suite
    write similar items to disk
// Step 3: find all contradictions in the finalized similar items dataframe
    find all records in the final similar set where the base label and
    the similar item label differs
    write contradictions to disk
// Step 4: optionally, allow for a new automated GT with label distribution similar to raw
for each label l in base records:
    provide a list of records in sim_candidates that if added to base will
    provide similar label distributions as raw As shown in Table 2, a plurality of raw training data elements may be received in a dataframe (input). In Step 1, a current data element instance (r_i) may be selected and may be compared to all elements within a base bucket (base—which is initially empty), utilizing a similarity measure module. The similarity measure module may return similarity metrics between the current data element instance and all element instances within the base bucket.

If any of the similarity metrics indicate that the current data element instance is similar to any data element instance in the base bucket, the current data element instance may be added to a similarity candidate bucket (sim_candidates). If the similarity metrics indicate that the current data element instance is not similar to all data element instances in the base bucket, the current data element instance may be added to the base bucket. This process may be continued for all data element instances within the dataframe.

Additionally, in Step 2, for each data element instance within the similarity candidate bucket, a data element instance may be identified within the base bucket that has been determined to be similar (to the data element instance within the similarity candidate bucket) based on similarity metrics provided by the similarity measure module.

Further, in Step 3, for each data element instance within the similarity candidate bucket, the label of the data element instance may be compared to the label of the data element instance within the base bucket that was determined to be similar (to the data element instance within the similarity candidate bucket). If the labels are determined to be different, the data element instance within the similarity candidate bucket may be determined to be a conflicting record and may be saved in a base conflicting repository. If the labels are determined to be similar, the data element instance within the similarity candidate bucket may be determined to be a similar record and may be saved in a base congruent repository. All data element instances in the base bucket may be determined to be dissimilar records and may be saved in a base repository.

Further still, in Step 4, labels of all data element instances within the base repository may be identified, and a base repository label distribution may be calculated. This base repository label distribution may be compared to a raw data label distribution determined utilizing the labels of all raw training data elements. If the base repository label distribution does not match the raw data label distribution, data elements within the base congruent repository may be identified that have labels that would adjust the base repository label distribution to match the raw data label distribution if the data elements were added to the base repository.

In this way, an orthogonal base set of text strings may be determined that span the space of a classifier's potential use, by finding highly dissimilar text items. Additionally, training data that is blatantly contradictory to the established orthogonal base set, and therefore may confuse the classifier and decrease accuracy, may be identified and removed. Further, the number of data records needed to train a model may be reduced (thereby decreasing an amount of necessary storage space) by removing congruent data while maintaining predetermined distributions in training data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying a first classifier training data element and a second classifier training data element;
    calculating a similarity metric between the first classifier training data element and the second classifier training data element;
    determining a classification for the first classifier training data element and the second classifier training data element, utilizing the similarity metric between the first classifier training data element and the second classifier training data element; and
    conditionally using the first classifier training data element and the second classifier training data element to train a classifier, based on the classification.

2. The computer-implemented method of claim 1, wherein the first classifier training data element and the second classifier training data element are included within a plurality of classifier training data elements used to train a natural language classifier.

3. The computer-implemented method of claim 1, wherein each classifier training data element includes textual data representative of a natural language statement and a label including a class associated with the textual data.

4. The computer-implemented method of claim 1, wherein the similarity metric is determined between textual data of the first classifier training data element and textual data of the second classifier training data element.

5. The computer-implemented method of claim 1, wherein the similarity metric is calculated utilizing one or more similarity measures that determine a numerical value indicative of a similarity between textual input data.

6. The computer-implemented method of claim 1, wherein determining the classification includes analyzing the similarity metric in view of a label of the first classifier training data element and a label of the second classifier training data element.

7. The computer-implemented method of claim 1, wherein the classification includes an indication that the first classifier training data element is similar to the second classifier training data element in response to determining that the similarity metric indicates that text of the first classifier training data element and the second classifier training data element is similar and labels of the first classifier training data element and the second classifier training data element are determined to be similar.

8. The computer-implemented method of claim 1, wherein the classification includes an indication that the first classifier training data element is dissimilar from the second classifier training data element in response to determining that the similarity metric indicates that text of the first classifier training data element and the second classifier training data element is different and labels of the first classifier training data element and the second classifier training data element are determined to be different.

9. The computer-implemented method of claim 1, wherein the classification includes an indication that the first classifier training data element and the second classifier training data element are conflicting in response to determining that the similarity metric indicates that text of the first classifier training data element and the second classifier training data element is similar, but labels of the first classifier training data element and the second classifier training data element are determined to be different.

10. The computer-implemented method of claim 1, wherein the classification is added as metadata to the first classifier training data element and the second classifier training data element.

11. The computer-implemented method of claim 1, wherein metadata identifying the first classifier training data element is added to the second classifier training data element in association with the classification, and metadata identifying the second classifier training data element is added to the first classifier training data element in association with the classification.

12. The computer-implemented method of claim 1, wherein:
    a first similarity metric is computed utilizing a ratio between textual data of the first classifier training data element and textual data of the second classifier training data element, where the ratio is based on a string metric between the textual data of the first classifier training data element and the textual data of the second classifier training data element,
    a second similarity metric is computed utilizing a character gram that determines a value indicating a similarity between characters and phrases within the textual data of the first classifier training data element and the textual data of the second classifier training data element, and
    the similarity metric is calculated utilizing a harmonic mean between the first similarity metric and the second similarity metric.

13. The computer-implemented method of claim 1, wherein the first classifier training data element and the second classifier training data element are included as new ground truth data and are used to train a classifier in response to determining that the classification includes an indication that the first classifier training data element is dissimilar from the second classifier training data element.

14. The computer-implemented method of claim 1, wherein the first classifier training data element and the second classifier training data element are included as new ground truth data and are used to train a classifier, but are assigned a priority lower than other classifier training data elements that are determined to be dissimilar, in response to determining that the classification includes an indication that the first classifier training data element is similar to the second classifier training data element.

15. The computer-implemented method of claim 1, wherein:
    the classification includes an indication that the first classifier training data element is similar to the second classifier training data element in response to determining that the similarity metric indicates that text of the first classifier training data element and the second classifier training data element is similar and labels of the first classifier training data element and the second classifier training data element are determined to be similar, the classification includes an indication that the first classifier training data element and the second classifier training data element are conflicting in response to determining that the similarity metric indicates that text of the first classifier training data element and the second classifier training data element is similar, but labels of the first classifier training data element and the second classifier training data element are determined to be different, the first classifier training data element and the second classifier training data element are included as new ground truth data and are used to train the classifier in response to determining that:
- the classification includes an indication that the first classifier training data element is dissimilar from the second classifier training data element, and
- the inclusion of the first classifier training data element and the second classifier training data element maintains an original distribution of labels found in a raw ground truth data set.

16. The computer-implemented method of claim 1, wherein the first classifier training data element and the second classifier training data element are discarded and not used to train a classifier in response to determining that the classification includes an indication that the first classifier training data element and the second classifier training data element are conflicting.

17. A computer-implemented method, comprising:
identifying a first classifier training data element and a second classifier training data element;
computing a first similarity metric utilizing a ratio between textual data of the first classifier training data element and textual data of the second classifier training data element, where the ratio is based on a string metric between the textual data of the first classifier training data element and the textual data of the second classifier training data element;
computing a second similarity metric utilizing a character gram that determines a value indicating a similarity between characters and phrases within the textual data of the first classifier training data element and the textual data of the second classifier training data element;
calculating a third similarity metric utilizing a harmonic mean between the first similarity metric and the second similarity metric;
determining a classification for the first classifier training data element and the second classifier training data element, utilizing the third similarity metric; and
conditionally using the first classifier training data element and the second classifier training data element to train a classifier, based on the classification.

18. A computer-implemented method, comprising:
identifying a first classifier training data element and a second classifier training data element;
calculating a similarity metric between the first classifier training data element and the second classifier training data element;
including within a classification for the first classifier training data element and the second classifier training data element an indication that the first classifier training data element is similar to the second classifier training data element in response to determining that the similarity metric indicates that text of the first classifier training data element and the second classifier training data element is similar and labels of the first classifier training data element and the second classifier training data element are determined to be similar;
including within the classification for the first classifier training data element and the second classifier training data element an indication that the first classifier training data element and the second classifier training data element are conflicting in response to determining that the similarity metric indicates that text of the first classifier training data element and the second classifier training data element is similar, but labels of the first classifier training data element and the second classifier training data element are determined to be different; and
including the first classifier training data element and the second classifier training data element as new ground truth data, and using the first classifier training data element and the second classifier training data element to train the classifier, in response to determining that:
- the classification for the first classifier training data element and the second classifier training data element includes an indication that the first classifier training data element is dissimilar from the second classifier training data element, and
- the inclusion of the first classifier training data element and the second classifier training data element maintains an original distribution of labels found in a raw ground truth data set.

* * * * *